US008874839B2

(12) United States Patent  (10) Patent No.: US 8,874,839 B2
Chiu  (45) Date of Patent: Oct. 28, 2014

(54) ELECTRONIC SYSTEM AND METHOD AND APPARATUS FOR SAVING DATA THEREOF

(75) Inventor: Chia-Chang Chiu, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 191 days.

(21) Appl. No.: 13/397,307

(22) Filed: Feb. 15, 2012

(65) Prior Publication Data

US 2013/0103900 A1  Apr. 25, 2013

Related U.S. Application Data

(60) Provisional application No. 61/550,278, filed on Oct. 21, 2011.

(51) Int. Cl.
*G06F 12/00* (2006.01)

(52) U.S. Cl.
USPC ............ 711/112; 700/12; 711/E12.084

(58) Field of Classification Search
None
See application file for complete search history.

(56) References Cited

U.S. PATENT DOCUMENTS

| | | | | |
|---|---|---|---|---|
| 6,788,928 | B2* | 9/2004 | Kohinata et al. | 455/411 |
| 7,437,579 | B2* | 10/2008 | Jeddeloh et al. | 713/300 |
| 7,441,949 | B2* | 10/2008 | Janzen et al. | 374/171 |
| 7,677,796 | B2* | 3/2010 | Janzen et al. | 374/171 |
| 7,793,059 | B2* | 9/2010 | Cornwell et al. | 711/157 |
| 7,796,038 | B2* | 9/2010 | Batra | 340/572.1 |
| 2004/0109255 | A1* | 6/2004 | Walz | 360/73.03 |
| 2007/0219644 | A1* | 9/2007 | Sonobe | 700/12 |
| 2008/0004067 | A1* | 1/2008 | Piipponen et al. | 455/550.1 |
| 2008/0027586 | A1* | 1/2008 | Hern et al. | 700/284 |
| 2008/0082846 | A1* | 4/2008 | Yoshioka et al. | 713/323 |
| 2008/0270691 | A1* | 10/2008 | Belady | 711/114 |
| 2008/0298191 | A1* | 12/2008 | Van Der Kall | 369/53.18 |
| 2009/0049312 | A1* | 2/2009 | Min | 713/300 |
| 2009/0055665 | A1* | 2/2009 | Maglione et al. | 713/320 |
| 2009/0089604 | A1* | 4/2009 | Malik et al. | 713/340 |
| 2009/0171513 | A1* | 7/2009 | Tsukazawa | 700/300 |
| 2010/0030395 | A1* | 2/2010 | Shimotono et al. | 700/300 |
| 2010/0102949 | A1* | 4/2010 | Rotem | 340/506 |
| 2010/0138682 | A1* | 6/2010 | Obana et al. | 713/340 |
| 2010/0180089 | A1* | 7/2010 | Flemming et al. | 711/157 |

OTHER PUBLICATIONS

Gennadiy Shvets, "Minimum/Maximum Operating Temperatures", Jul. 18, 2007, pp. 1-1, http://web.archive.org/web/20070718022453/http://www.cpu-world.com/Glossary/M/Minimum_Maximum_operating_temperatures.html.*
Webopedia, "Prompt", Oct. 18, 2002, pp. 1-1, http://web.archive.org/web/20021018103136/http://webopedia.com/TERM/P/prompt.html.*

* cited by examiner

*Primary Examiner* — Christopher Birkhimer

(57) ABSTRACT

An electronic system, and a method and an apparatus for saving data of the electronic system are provided. The electrical system includes a central processing unit (CPU), a temperature sensor, a first controller, a second controller, a first storage device and a second storage device. When the CPU enters a suspend mode and the first controller detects a temperature of the electronic system to be lower than a threshold value through the temperature sensor, the second controller notify the application program to trigger the CPU to enter a hibernation mode, and operation data is moved from the first storage device to the second storage device.

22 Claims, 4 Drawing Sheets

ELECTRONIC SYSTEM AND METHOD AND APPARATUS FOR SAVING DATA THEREOF

BACKGROUND OF THE INVENTION

1. Field of the Invention

The invention relates to an electronic system. Particularly, the invention relates to a method and an apparatus for saving data of an electronic system.

2. Description of Related Art

With development of technology, the entire personal computer industry has developed a plurality of new specifications. The Intel, the Microsoft and the Toshiba provide the advanced configuration and power interface (ACPI) specification, which specifies a plurality of modes, between a working state and a power-off state of a computer system. And the computer system determines which specific mode to enter according to the workload, so as to save energy. The ACPI specification includes a normal working mode S0 and sleep modes of S1, S3, S4 and S5, etc. In the S0 mode, all of the devices are enabled, and in the normal working mode.

In the S3 mode, setting values of all of the devices (for example, a central processing unit (CPU), a chipset and other devices) are stored in a random access memory (RAM). When the computer system recovers to the normal working mode S0 from the S3 mode, the computer system has to set the devices such as the CPU, etc according to the setting values in the RAM. In the S3 mode, the devices enter the power-off state except for some devices using the suspend power and the RAM. In the S4 mode, the system stores the setting values of all devices onto the hard disc drive (HDD), and then the power of all devices in the computer system is off. When the computer system is going to the S0 mode from the S4 mode, the computer system has to set the devices such as the CPU, etc. with the setting values saved in the HDD.

In the normal working state, the internal devices (for example, the CPU, etc.) of the computer system heat up naturally, so that the temperature of the RAM is maintained in a normal temperature range when the computer system is in a low temperature environment. However, once the computer system enters the S3 suspend mode in the low temperature environment (for example, an environment with the temperature lower than 0 degree Celsius), the internal temperature of the computer system suddenly drops because of the suspension of the power supplied to the most of the internal devices (for example, the CPU, etc.) of the computer system. The low temperature environment may cause loss of data in the RAM. When the setting values stored in the RAM lose due to the low temperature, the computer system cannot recover to the S0 mode.

SUMMARY OF THE INVENTION

The invention is directed to an electronic system, a method and an apparatus for saving data thereof, by which data and running application programs are prevented from losing in a low temperature environment.

The invention provides an electronic system including a central processing unit (CPU), a temperature sensor, a first controller, a second controller, a first storage device and a second storage device. The CPU and the temperature sensor are disposed in the electronic system. The first controller is coupled to the temperature sensor, and senses a temperature of the electronic system through the temperature sensor. When the temperature of the electronic system is lower than a first threshold value, the first controller stores a flag value as a first constant value. The second controller is coupled to the CPU and the first controller. After the CPU enters a suspend mode, when the second controller detects that the flag value is the first constant value, the second controller generates an event to notify an application program. The application program triggers the CPU to enter a hibernation mode according to the event, and operation data is moved from the first storage device to the second storage device.

The invention provides an apparatus for saving data of an electronic system in a low temperature environment, which includes a temperature sensor, a first controller, a second controller, a first storage device and a second storage device. The first controller is coupled to the temperature sensor, and senses a temperature of the electronic system through the temperature sensor. When the temperature of the electronic system is lower than a first threshold value, the first controller stores a flag value as a first constant value. After the electronic system enters a suspend mode, when the second controller detects that the flag value is the first constant value, the second controller generates an event to notify an application program. The application program triggers the electronic system to enter a hibernation mode according to the event, and operation data is moved from the first storage device to the second storage device.

The invention provides a method for saving data of an electronic system in a low temperature environment, which includes following steps. The electronic system enters a suspend mode, and operation data is moved to a first storage device. It is detected whether a temperature of the electronic system is lower than a first threshold value, and if yes, a first controller stores a flag value as a first constant value. When the second controller detects that the flag value is the first constant value, the second controller generates an event to notify an application program. The application program triggers the electronic system to enter a hibernation mode according to the event, and the operation data is moved to the second storage device.

According to the above descriptions, the electronic system and the method and the apparatus for saving data thereof, regardless whether the electronic system enters the suspend mode from the power-off mode or the electronic system is in the normal operation mode, once the temperature sensor detects that the temperature of the electronic system is lower than the predetermined threshold value, the related data saving mechanism is activated. Therefore, the method and the apparatus for saving data of the invention are capable of preventing data and running application programs from losing in a low temperature environment.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

An electronic system, and a method and an apparatus for saving data of the electronic system are introduced below. In a low temperature environment, the method and the apparatus for saving data are capable of automatically resuming the electronic system from a suspend mode to make the electronic system automatically enter a hibernation mode, so as to prevent data and running applications from missing. In order to fully convey the content of the invention, embodiments are provided below for detail descriptions.

Figure 1:
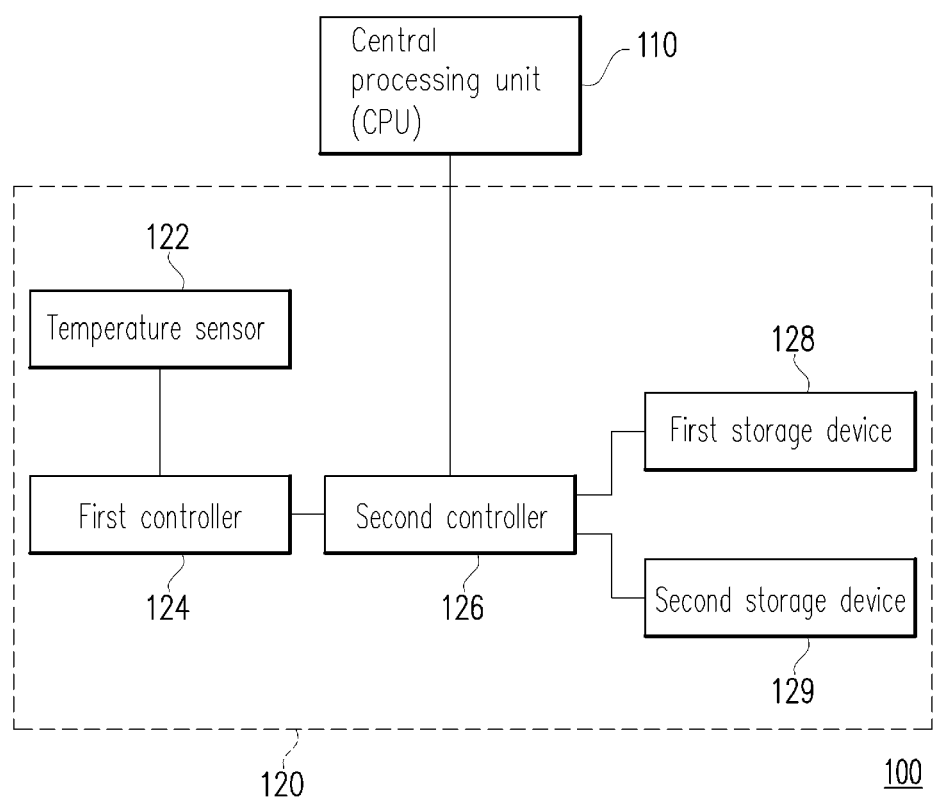
FIG. 1 is a structural schematic diagram of an electronic system according to an embodiment of the invention.

Referring to FIG. 1, FIG. 1 is a structural schematic diagram of an electronic system 100 according to an embodiment of the invention. The electronic system 100 includes a central processing unit (CPU) 110 and a data saving apparatus 120. The data saving apparatus 120 is coupled to the CPU 110, and includes a temperature sensor 122, a first controller 124, a second controller 126, a first storage device 128 and a second storage device 129. The controller 124 can be a keyboard controller (KBC), a baseboard management controller (BMC), a microcontroller or other controllers. The controller 124 is coupled to the temperature sensor 122 and the controller 126. The controller 126 can be a basic input/output system (BIOS), a chipset, a north bridge chip, a south bridge chip or other control chips. For example, if the controller 126 is a chipset, hardware/firmware of the chipset can execute various functions of the controller 126 of the following embodiments. If the controller 126 is a BIOS, firmware codes of the BIOS can be executed by the CPU 110 and/or the chipset to implement various functions of the controller 126 of the following embodiments.

In the present embodiment, the controller 126 is the BIOS. The controller 126 is coupled to the storage device 128 and the storage device 129. In the present embodiment, the storage device 128 can be a random access memory (RAM) or other volatile memories (VM), and the storage device 129 can be a hard disc drive (HDD), a solid state disk (SSD), an electrically erasable programmable read only memory (EEPROM) or other non-volatile memories (NVM).

In an embodiment of the invention, when the electronic system enters the suspend mode, the operation data of the CPU 110 is stored in the storage device 128 so as to turn off the power of the CPU 110. The suspend mode is, for example, an S3 mode of the advanced configuration and power interface (ACPI). Now, the controller 124 senses whether the temperature of the electronic system 100 is lower than a predetermined threshold value (for example, minus 5 degrees Celsius) through the temperature sensor 122. The temperature sensor 122 includes one or a plurality of sensors. Based on positions of the sensors, the temperature sensed by the temperature sensor 122 can be a temperature of a main memory, a temperature of a battery module, a temperature of a HDD, a temperature of a printed circuit board and/or other internal temperatures of the electronic system 100. In other embodiments, the temperature sensor 122 can also sense an external temperature of the electronic system 100.

In the suspend mode, when the temperature of the electronic system 100 is lower than the predetermined threshold value, and lasts for a predetermined time (for example, 10 seconds), the controller 124 stores a flag value as a first constant value (for example, a logic value 1), and wakes the electronic system 100. Here, the controller 126 is the BIOS.

Figure 2:
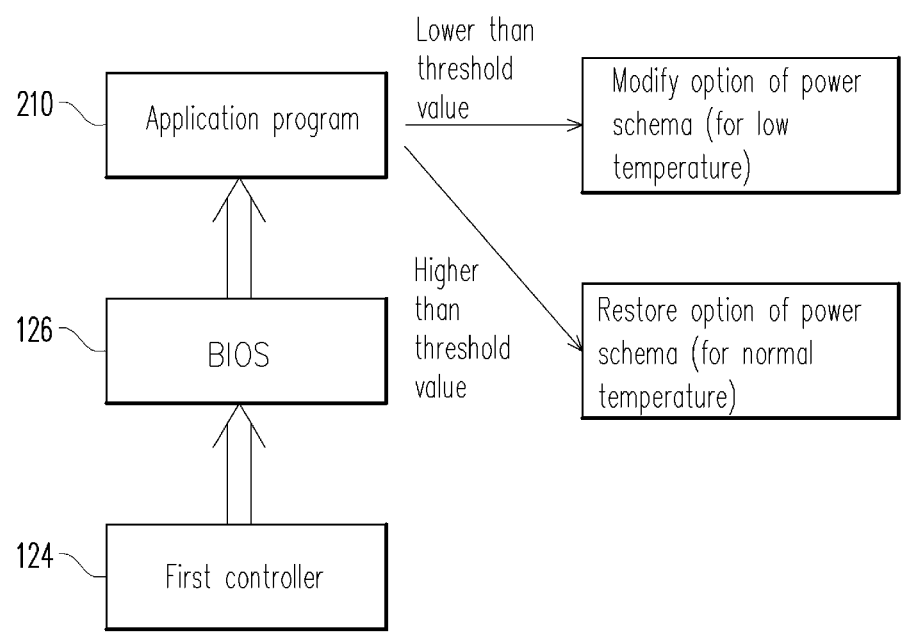
FIG. 2 is a flowchart of a process that a controller notifies an application program.

Referring to FIG. 1 and FIG. 2, FIG. 2 is a flowchart of a process that the controller 124 notifies an application program. The controller 124 monitors the environment temperature. When the temperature of the electronic system 100 is excessively low, the controller 124 generates an event to resume the electronic system 100 from the suspend mode.

After the CPU 110 and the controller 126 (i.e. the BIOS) of the electronic system 100 are resumed from the suspend mode, the controller 126 detects the flag value stored in the controller 124. When the controller 126 detects that the flag value is not the first constant value (for example, a logic value 0), it represents that the resumption of the controller 124 is a general resumption (which is not a resumption performed due to the low temperature), and the controller 126 does not notify the event to the application program 210 of an higher layer. When the controller 126 detects that the flag value is the first constant value (for example, the logic value 1), the controller 126 generates the event to notify the application program 210 of the higher layer.

When the application program 210 in the higher layer receives the event from the controller 126 (i.e. the BIOS), the application program 210 triggers the CPU 110 to enter a hibernation mode (for example, the S4 mode of the ACPI) according to the event, so as to prevent the operation data/program of the system from missing due to the low temperature. Before the CPU 110 enters the hibernation mode, the controller 126 stores the operation data of the CPU 110 to the storage device 129, and moves the operation data of the storage device 128 (i.e. the main memory) to the storage device 129. Since the storage device 129 can still maintain the operation data of the CPU 110 and the main memory in the low temperature condition, the operation data in the storage device 129 can be successfully written back to the CPU 110 and the main memory when the CPU 110 returns to a normal operation mode (for example, an S0 mode of the ACPI) from the hibernation mode.

In an embodiment of the invention, before the CPU 110 is triggered to enter the hibernation mode, the controller 124 first wakes the electronic system 100 and the CPU 110 to return back to the normal operation mode. And then the electronic system 100 and the CPU 110 enter the hibernation mode from the normal operation mode. Therefore, in the low temperature environment, if the electronic system 100 enters the suspend mode, the data saving apparatus 120 can protect the operation data of the CPU 110 and the main memory. Conversely, after the electronic system 100 enters the suspend mode, the controller 124 may set the flag value to be 0 when the temperature sensor 122 detects that the temperature of the electronic system 100 is higher than the predetermined threshold value. And the controller 126 does not generate the event when detecting that the flag value is 0. So none setting of the application program of the higher layers changes, and the electronic system 100 is maintained to the suspend mode.

In another embodiment, the application program can use a hybrid sleep mode to protect the operation data of the CPU 110 and the main memory. The so-called hybrid sleep mode means that the operation data of the CPU 110 and the main memory are stored in the storage device 128 and the storage device 129 when the electronic system 100 is about to enter the suspend mode. When the electronic system 100 is in the normal operation mode, the controller 124 can sense the external temperature of the electronic system 100 through the temperature sensor 122.

When the external temperature of the electronic system 100 is excessively low (for example, lower than the predetermined threshold value or other threshold values), the application program can detect whether the option of the hybrid sleep mode of the electronic system 100 is enabled. If the option of the hybrid sleep mode of the electronic system 100 is not enabled, the application program sets the option of the hybrid sleep mode enabled. Therefore, after the CPU 110 enters the suspend mode, the storage device 129 still has the operation data of the CPU 110 and the main memory even if the storage device 128 loses data due to the low temperature environment. When the CPU 110 returns back to the normal operation mode (the S0 mode of the ACPI) from the hibernation mode, the operation data in the storage device 129 can be successfully written back to the CPU 110 and the main memory.

In another embodiment, when the electronic system 100 enters the suspend mode, the controller 124 notifies through the controller 126 to first detect whether the option of the hybrid sleep mode is enabled. If the electronic system 100 has enabled the option of the hybrid sleep mode and the temperature of the electronic system 100 is lower than the predetermined threshold value, the controller 124 directly turns off the power of the electronic system 100 (enters the power-off mode) after being in the low temperature for a period of time (for example, 10 seconds). When the electronic system 100 is turned on next time, the electronic system 100 can recover to the normal operation mode from the hibernation mode. If the electronic system 100 does not enable the option of the hybrid sleep mode, the mechanism described in the aforementioned embodiment is triggered. In brief, the electronic system 100 resumes the normal operation mode from the suspend mode, and then enters the hibernation mode, so as to achieve a low temperature protection function.

In another embodiment, when the electronic system 100 is in the normal operation mode, and the temperature of the electronic system 100 that is sensed by the temperature sensor 122 is lower than the predetermined threshold value, the controller 126 prohibits the CPU 110 of the electronic system 100 from entering the suspend mode. For example, the controller 124 notifies the application program of the higher layer to modify a power schema of the electronic system 100 to "no entering of the suspend mode" through the BIOS executed on the controller 126, and notifies the user a warning message, for example, a message of "unsuitable to enter the suspend mode due to low temperature". In this way, the data saving apparatus 120 can prevent the application program and data from losing in the low temperature environment.

Figure 3:
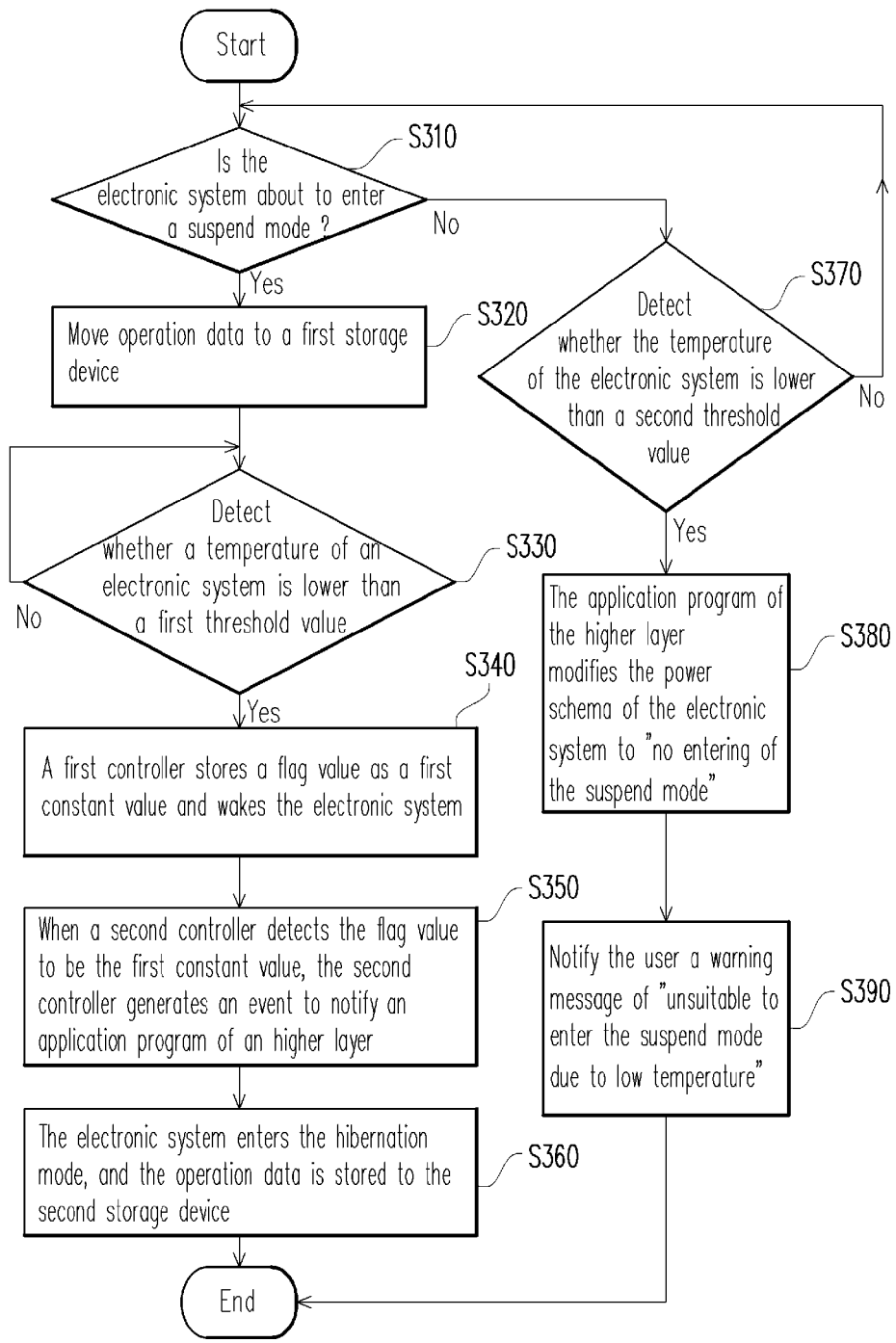
FIG. 3 is a flowchart illustrating a method for saving data of an electronic system according to an embodiment of the invention.

FIG. 3 is a flowchart illustrating a method for saving data of an electronic system according to an embodiment of the invention. Referring to FIG. 1 and FIG. 3, the method for saving data of the electronic system includes following steps. In the normal operation mode, it is determined whether the electronic system 100 is about to enter the suspend mode (step S310). If the electronic system 100 is to enter the suspend mode, the operation data of the CPU 110 is moved to the first storage device 128 (step S320), and then the electronic system 100 enters the suspend mode. Then, the first controller 124 detects whether the temperature of the electronic system 100 is lower than a predetermined first threshold value through the temperature sensor 122 (step S330).

If the temperature of the electronic system 100 is lower than the predetermined first threshold value, the first controller 124 stores the flag value as the first constant value (for example, the logic value 1), and wakes the electronic system 100 to enter the normal operation mode (step S340). Then, when the electronic system 100 and the second controller 126 are resumed and the second controller 126 detects that the flag value of the first controller 124 is the first constant value, the second controller 126 generates an event to notify the application program of the higher layer (step S350). Then, when the application program of the higher layer receives the event from the second controller 126, the application program triggers the electronic system 100 in the normal operation mode to enter the hibernation mode (for example, the S4 mode of the ACPI) according to the event, and the operation data of the CPU 110 and the first storage device 128 is stored/moved to the second storage device 129 (step S360).

On the other hand, if the electronic system 100 is in the normal operation mode, the temperature sensor 122 detects whether the temperature of the electronic system 100 is lower than the predetermined threshold value (step S370). If yes, the application program of the higher layer modifies the power schema of the electronic system 100 to "no entering of the suspend mode" (step S380), and notifies the user a warning message of "unsuitable to enter the suspend mode due to low temperature" (step S390), which have been described in detail in the aforementioned embodiment, and details thereof are not repeated.

Figure 4:
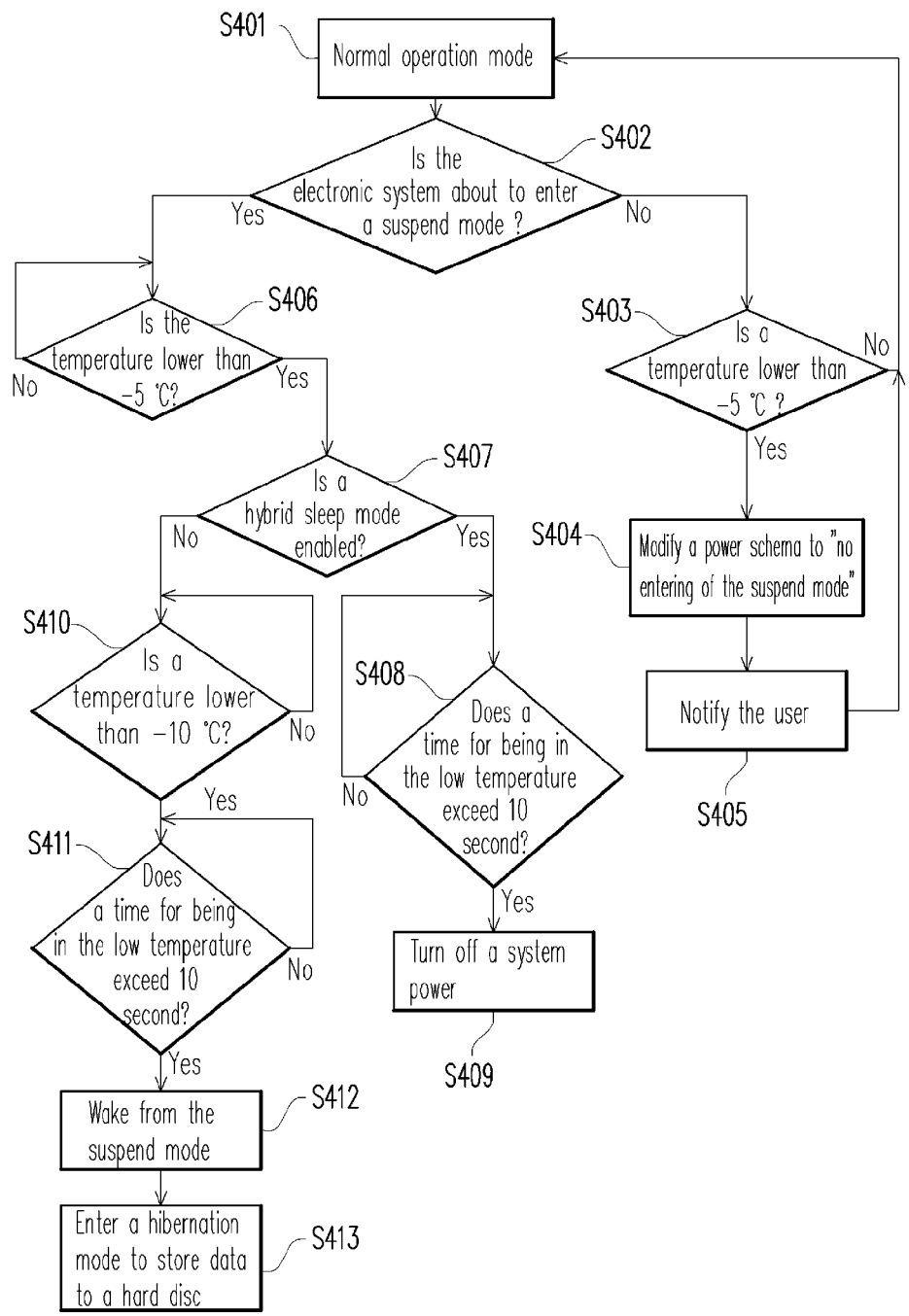
FIG. 4 is a flowchart illustrating a method for saving data of an electronic system according to another embodiment of the invention.

FIG. 4 is a flowchart illustrating a method for saving data of an electronic system according to another embodiment of the invention. Referring to FIG. 4, generally, the electronic system 100 is in the normal operation mode, for example, the S0 mode of the ACPI (step S401). In step S402, it is determined whether the electronic system 100 is about to enter the suspend mode. If the determination result of the step S402 is negative, i.e. the electronic system 100 is still in the normal operation mode, the temperature sensor 122 detects whether the temperature of the electronic system 100 is lower than the predetermined threshold value, for example, minus 5 degrees Celsius (i.e., $-5°$ C.) (step S403). If the detection result of the step S403 is negative, i.e. the temperature of the electronic system 100 is still in a normal operation temperature range, the step S401 is returned. If the detection result of the step S403 is affirmative, the application program of the higher layer modifies the power schema of the electronic system 100 to "no entering of the suspend mode" (step S404), and notifies the user a warning message of "unsuitable to enter the suspend mode due to low temperature" through an image, a lamp, a sound or other methods (step S405). After the step S405, the electronic system 100 is still in the normal operation mode.

If the determination result of the step S402 is affirmative (i.e. the electronic system 100 enters the suspend mode), the first controller 124 detects whether the temperature of the electronic system 100 is lower than the predetermined first threshold value through the temperature sensor 122. The predetermined first threshold value, for example, is minus 5 degrees Celsius (step S406). If the detection result of the step S406 is negative (i.e. the temperature of the electronic system 100 is still in the normal operation temperature range), the first controller 124 continually monitors the temperature of the electronic system 100. If the detection result of the step S406 is affirmative, the electronic system 100 detects whether the option of the hybrid sleep mode is enabled (step S407). If the option of the hybrid sleep mode of the electronic system 100 is set/enabled, the first controller 124 counts how much time the electronic system 100 is in the suspend mode and in the low temperature environment (step S408). If the time the electronic system 100 in the suspend mode is greater than a predetermined time (for example, 10 seconds), the first controller 124 directly turns off the power of the electronic system 100 (in other words, the electronic system 100 enters the power-off mode) (step S409). When the electronic system 100 is turned on next time, the electronic system 100 can return back to the normal operation mode from the hibernation mode.

If the detection result of the step S407 is negative, i.e. the option of the hybrid sleep mode of the electronic system 100 is disabled, the controller 124 detects whether the temperature of the electronic system 100 is lower than a predetermined second threshold value through the temperature sensor 122. For example, the predetermined second threshold value is minus 10 degrees Celsius (step S410). If the detection result of the step S410 is negative, which means the temperature of the main memory of the electronic system 100 is still in the normal operation temperature range, the first controller 124 continually monitors the temperature of the electronic system 100. If the detection result of the step S410 is affirmative, the electronic system 100 counts how much time the electronic system 100 is in the suspend mode and in the low temperature environment (step S411). If the time he electronic system 100 is in the suspend mode is greater than a predetermined time (for example, 10 seconds), the first controller 124 stores the flag value as the first constant value (for example, the logic value 1), and wakes the electronic system 100 (step S412).

After the CPU 110 and the controller 126 (for example, the BIOS) of the electronic system 100 resume from the suspend mode, the controller 126 detects the flag value stored in the controller 124. Since the controller 126 detects that the flag value is the logic value 1, the controller 126 generates an event to the application program of the higher layer. When the application program of the higher layer receives the event from the controller 126 (i.e. the BIOS), the application program triggers the CPU 110 to enter the hibernation mode (for example, the S4 mode of the ACPI) according to the event so as to store the operation data of the CPU 110 and the main memory (for example, the storage device 128) to the storage device 129 (for example, a HDD) (step S413). Therefore, the flow of FIG. 4 can prevent the operation data/program of the electronic system 100 from losing in the low temperature environment.

In summary, the electronic system, the method and the apparatus for saving data of the electronic system have at least following advantages:

1. This invention can prevent the electronic system from losing data and being failed to recover when the electronic system is in the suspend mode and in the low temperature environment for a long time.
2. Data of the running application programs can be stored to the HDD. If the power supply is interrupted or an abnormal low temperature environment is encountered, the data can be saved.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for saving data of an electronic system in a low temperature environment, wherein the electronic system comprises a first controller and a second controller, the method comprising:
    the electronic system entering a suspend mode, and moving operation data to a first storage device;
    detecting whether a temperature of the electronic system is lower than a first threshold value, if yes, the first controller storing a flag value as a first constant value;
    the second controller generating an event to notify an application program when the second controller detects that the flag value is the first constant value; and
    the application program triggering the electronic system to enter a hibernation mode according to the event, and moving the operation data to a second storage device.

2. The method for saving data of the electronic system in the low temperature environment as claimed in claim 1, wherein the step of detecting whether the temperature of the electronic system is lower than the first threshold value comprises:
    detecting whether the temperature of the electronic system being lower than the first threshold value lasts for a time value, if yes, storing the flag value as the first constant value.

3. The method for saving data of the electronic system in the low temperature environment as claimed in claim 1, further comprising:
    prohibiting the electronic system from entering the suspend mode when the electronic system is in a normal operation mode and the temperature of the electronic system is lower than a second threshold value.

4. The method for saving data of the electronic system in the low temperature environment as claimed in claim 3, wherein the step of prohibiting the electronic system from entering the suspend mode comprises:
    the application program modifying a power schema of the electronic system to "no entering of the suspend mode" when the temperature of the electronic system is lower than the second threshold value and the electronic system is in the normal operation mode; and
    notifying a user a message of "unsuitable to enter the suspend mode due to low temperature".

5. The method for saving data of the electronic system in the low temperature environment as claimed in claim 1, wherein the step of detecting the temperature of the electronic system comprises detecting a temperature of a main memory, a battery module, a hard disc drive or a printed circuit board in the electronic system.

6. The method for saving data of the electronic system in the low temperature environment as claimed in claim 1, wherein the step of triggering the electronic system to enter the hibernation mode comprises:
    making the electronic system enter a normal operation mode, and then making the electronic system enter the hibernation mode.

7. The method for saving data of the electronic system in the low temperature environment as claimed in claim 1, wherein the suspend mode is an S3 mode of an advanced configuration and power interface, and the hibernation mode is an S4 mode of the advanced configuration and power interface.

8. The method for saving data of the electronic system in the low temperature environment as claimed in claim 1, wherein the first storage device is a memory, and the second storage device is a hard disc drive.

9. The method for saving data of the electronic system in the low temperature environment as claimed in claim 1, wherein after the step of the electronic system entering the suspend mode, the method further comprises:
    detecting whether a hybrid sleep option in which operation data is moved into both the first storage device and the second storage device is enabled, if yes, powering off the electronic system when the temperature of the electronic system is lower than a third threshold value.

10. The method for saving data of the electronic system in the low temperature environment as claimed in claim 1, wherein the first controller is a keyboard controller, and the second controller is a basic input/output system.

11. An apparatus for saving data of an electronic system in a low temperature environment, comprising:
- a temperature sensor, disposed in the electronic system;
- a first controller, coupled to the temperature sensor, and sensing a temperature of the electronic system through the temperature sensor, wherein when the temperature of the electronic system is lower than a first threshold value, the first controller stores a flag value as a first constant value;
- a first storage device;
- a second storage device;
- a second controller, coupled to the first controller; and
- an application program,
- configured such that after the electronic system enters a suspend mode, the second controller generates an event to notify the application program when the second controller detects that the flag value is the first constant value, and the application program triggers the electronic system to enter a hibernation mode according to the event, and operation data is moved to the second storage device from the first storage device.

12. The apparatus for saving data of the electronic system in the low temperature environment as claimed in claim 11, configured such that when the first controller detects that the temperature of the electronic system is lower than the first threshold value through the temperature sensor, the first controller further determines whether the temperature of the electronic system being lower than the first threshold value for a time value, if yes, the first controller stores the flag value as the first constant value.

13. The apparatus for saving data of the electronic system in the low temperature environment as claimed in claim 11, configured such that when the electronic system is in a normal operation mode, and the temperature of the electronic system is lower than a second threshold value, the second controller prohibits the electronic system from entering the suspend mode.

14. The apparatus for saving data of the electronic system in the low temperature environment as claimed in claim 13, configured such that when the temperature of the electronic system is lower than the second threshold value and the electronic system is in the normal operation mode, the application program modifies a power schema of the electronic system to "no entering of the suspend mode", and the application program notifies a user a message of "unsuitable to enter the suspend mode due to low temperature".

15. The apparatus for saving data of the electronic system in the low temperature environment as claimed in claim 11, configured such that when the flag value is the first constant value, the first controller makes the electronic system enter a normal operation mode, and then the application program makes the electronic system enter the hibernation mode.

16. The apparatus for saving data of the electronic system in the low temperature environment as claimed in claim 11, further comprising a hybrid sleep option in which operation data is moved into both the first storage device and the second storage device, configured such that after the electronic system enters the suspend mode when the hybrid sleep option is enabled, the electronic system is powered off when the temperature of the electronic system is lower than a third threshold value.

17. An electronic system, comprising:
- a central processing unit, disposed in the electronic system;
- a temperature sensor, disposed in the electronic system;
- a first controller, coupled to the temperature sensor, and sensing a temperature of the electronic system through the temperature sensor, wherein when the temperature of the electronic system is lower than a first threshold value, the first controller stores a flag value as a first constant value;
- a first storage device;
- a second storage device;
- a second controller, coupled to the central processing unit and the first controller; and
- an application program,
- configured such that after the central processing unit enters a suspend mode, the second controller generates an event to notify the application program when the second controller detects that the flag value is the first constant value, and the application program triggers the central processing unit to enter a hibernation mode according to the event, and operation data is moved to the second storage device from the first storage device.

18. The electronic system as claimed in claim 17, configured such that when the first controller detects that the temperature of the electronic system is lower than the first threshold value through the temperature sensor, the first controller further determines whether the temperature of the electronic system being lower than the first threshold value lasts a time value, if yes, the first controller stores the flag value as the first constant value.

19. The electronic system as claimed in claim 17, configured such that when the electronic system is in a normal operation mode and the temperature of the electronic system is lower than a second threshold value, the second controller prohibits the electronic system from entering the suspend mode.

20. The electronic system as claimed in claim 19, configured such that when the temperature of the electronic system is lower than the second threshold value and the electronic system is in the normal operation mode, the application program modifies a power schema of the electronic system to "no entering of the suspend mode", and the application program notifies a user a message of "unsuitable to enter the suspend mode due to low temperature".

21. The electronic system as claimed in claim 17, configured such that when the flag value is the first constant value, the first controller makes the electronic system enter a normal operation mode, and then the application program makes the electronic system enter the hibernation mode.

22. The electronic system as claimed in claim 17, further comprising a hybrid sleep option in which operation data is moved into both the first storage device and the second storage device, configured such that after the electronic system enters the suspend mode when the hybrid sleep option is enabled, the electronic system is powered off when the temperature of the electronic system is lower than a third threshold value.

* * * * *